March 6, 1928. 1,661,714
A. T. BRENNAN
METHOD OF AND APPARATUS FOR MANUFACTURING SCREEN FRAME STOCK
Filed Nov. 4, 1926 2 Sheets-Sheet 2

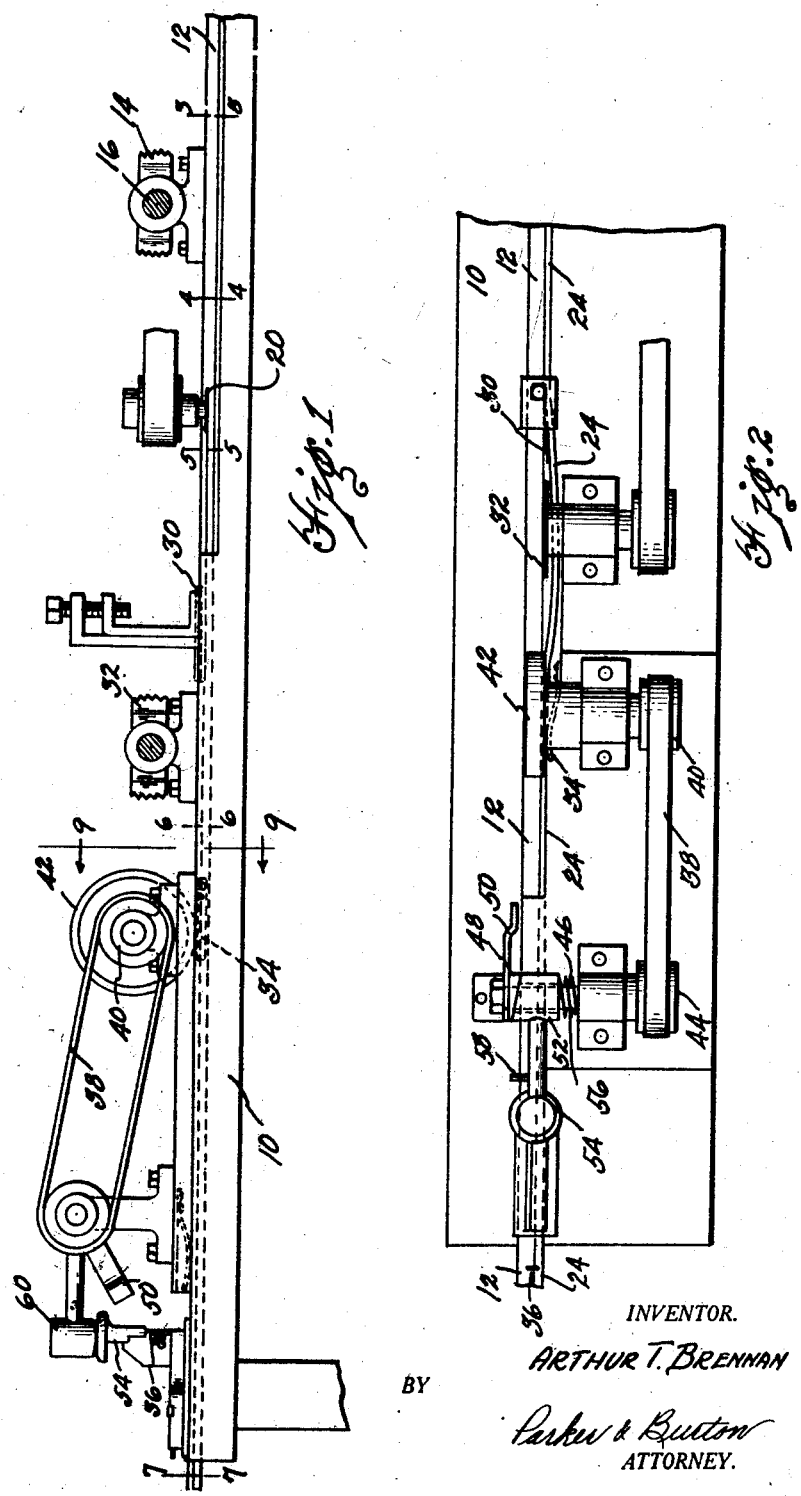

INVENTOR.
ARTHUR T. BRENNAN
BY Parker & Burton
ATTORNEY.

Patented Mar. 6, 1928.

1,661,714

UNITED STATES PATENT OFFICE.

ARTHUR T. BRENNAN, OF DETROIT, MICHIGAN.

METHOD OF AND APPARATUS FOR MANUFACTURING SCREEN-FRAME STOCK.

Application filed November 4, 1926. Serial No. 146,101.

My invention relates to improvements in the art of manufacturing screen-frame stock, improved apparatus for manufacturing such stock, and improved screen-frame stock.

The object is to provide an improved method and apparatus for the manufacture of screen-frame stock which operation is of such a character that the frame stock is produced at a minimum cost and with a minimum wastage of material. A further object is to provide such a method and apparatus whereby my improved screen-frame stock may be produced cheaply, expeditiously and accurately.

My improved machine is so constructed that the work passes continuously therethrough and emerges therefrom as a completed article. The several meretorious features and prominent advantages of this improved machine and the improved process employed by me will more fully appear from the following description of the illustrative embodiment of my invention shown in the accompanying drawing. The invention will also be more clearly brought out by the claims defining the same.

In the drawings I have illustrated apparatus suitable for the working of my improved process and have likewise illustrated the character of the work during the steps of the process.

In the drawings:

Fig. 1 is a side elevation, partly broken away, of a machine embodying my improvement and apparatus.

Fig. 2 is a plan of a fragment of the machine illustrated in Figure 1.

Figs. 3, 4, 5, 6 and 7, illustrate cross-sectional views through a piece of frame stock during its passage through the machine, taken on the cross-sectional lines 3, 4, 5, 6 and 7, of Fig. 1.

Figure 8:
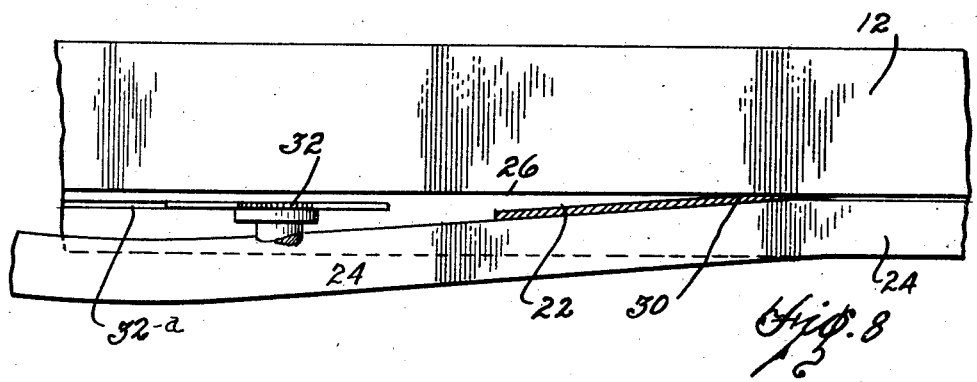

Fig. 8 is a plan view partly in cross-section, of a fragment of the machine.

Figure 9:
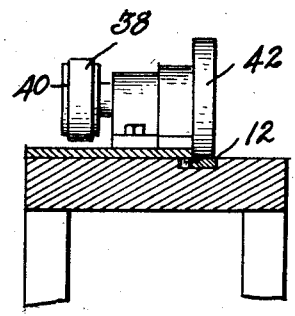

Fig. 9 is a cross-sectional view taken on line 9—9 of Fig. 1.

My invention relates to the formation of the frame stock which is employed in the fabrication of screen frames, and in screen-frame stock of the type to which my invention pertains, the stock is formed in two sections which in combined cross-section are substantially rectangular. One of these sections is substantially larger than the other and is provided with a shoulder along one corner. The other section is shaped to seat upon the shoulder of the first section. In the completed frame the screen wire is held between the two sections. My invention relates to an improved process and apparatus for the manufacture of these two sections.

Figure 3:
Figure 4:
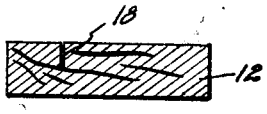

Fig. 3 is a cross-section through a piece of unfinished stock suitable to be used in the manufacture of my improved screen-frame stock. This unfinished stock is operated upon according to the steps of my improved process and is illustrated in Fig. 1 of the drawing as being passed through my improved machine.

In Fig. 1 the machine bed is indicated at 10. The unfinished stock or board 12, shown in Fig. 3, is passed over the face of the machine through suitable surfacing apparatus not specifically shown. Power mechanism, not shown, is provided to drive the various cutting elements and operating devices upon the machine. A saw 14 is mounted upon a shaft 16 and is positioned to cut a kerf 18 in the board 12. A second saw 20 is supported in a plane arranged at substantially a right angle to the plane of the saw 14 to cut a second kerf in the board, which kerf is indicated as 22.

These two relatively angularly disposed incisions sever a longitudinal strip 24 from the main portion of the board along one corner thereof and produce the shoulder in such main portion defined by the side wall 26 and the bottom face 28. The machine is provided with a spreader 30 which is supported to enter the kerf 18 and arranged at such an angle as to spread the strip 24 laterally away from the side 26 of the shoulder as illustrated in Figures 2 and 8 of the drawing.

Figure 6:
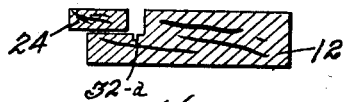
Figure 7:
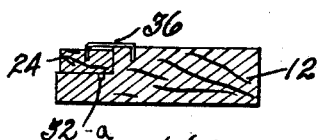

A saw 32 is supported to travel within the opening formed by the spreader 30 to cut a kerf 32ª in the bottom of the shoulder formed on the frame member, spaced from the side wall thereof, as shown in Figures 6 and 7. This kerf is adapted to receive the edge of the screen mesh in a complete frame structure.

Figure 5:
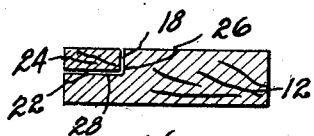

A yielding spring member 34 is provided which spring bears against the outer face of the board and particularly the outer face of the strip 24 and moves said strip laterally upon the shoulder back into the position shown in Figure 5 and as illustrated in Figure 2 of the drawing.

I provide stapling mechanism coordinated in operation with the travel of the board through the machine adapted to secure the strip 24 in place upon the shoulder of the board by means of staples 36. This stapling mechanism is here shown as driven by a belt 38 from a pulley wheel 40 mounted upon a shaft which carries a friction faced wheel 42 that rides upon the board 12 to be rotated thereby. This belt drives a pulley 44 which rotates a shaft 46 upon which is fixed a cam 48 and an arm 50. There is loosely mounted upon the shaft a second cam 52 which carries a hammer 54. This cam 52 is held toward the cam 48 by a spring 56. Upon rotation of the shaft through driving the pulley 44, the spring 56 holds the cam 52, which is loosely mounted upon the shaft, against the cam face of the part 48, which is fixed upon the shaft; and the arm 50, which rotates with the shaft, engages the pin 58 picking up the hammer 54 and elevating such hammer. The hammer, during its elevation, is moved laterally by virtue of the cam action of the parts 52 and 48 so that the pin disengages the arm 50 when the hammer arrives at an elevated position and the hammer is released to fall of its own weight. The hammer has a weighted portion 60 which causes it to drop with sufficient force to drive the staples 36 which are fed outwardly by suitable feeding mechanism of any well known construction. This operation is repeated in the manner described during the continuation of operation of the machine.

It will appear that the operation is a continuous one. The frame stock is fed uninterruptedly through the machine. It emerges from the machine in a finished form. The entire mechanism can be operated by a single workman. The finished frame stock is produced with a minimum cost of labor and with a minimum wastage of material. It has heretofore been the practice to form the separate sections of frame stock of this general type separately and it has been found that it was more expensive to produce the small section than the large section due to the high percentage of breakage resulting in the handling and formation of the small section as a separate unit.

What I claim is:

1. In a machine for manufacturing screen-frame stock; angularly arranged saws adapted to separate a longitudinal strip, substantially rectangular in cross section, out of one corner of a piece of frame stock; means adapted to spread said strip, as it leaves the saws, away from the body of the piece of frame stock; a saw arranged to travel in the opening produced by such spreading of the strip to cut a kerf in the bottom of the shoulder formed by the removal of the strip, which kerf is spaced from the side wall of said shoulder; and means engaging the strip beyond said saw to move the same into position upon said shoulder over said kerf.

2. In a machine for manufacturing screen-frame stock; angularly arranged saws adapted to separate a longitudinal strip, substantially rectangular in cross section, out of one corner of a piece of frame stock; means adapted to spread said strip, as it leaves the saws, away from the body of the piece of frame stock; a saw arranged to travel in the opening produced by such spreading of the strip to cut a kerf in the bottom of the shoulder formed by the removal of the strip, which kerf is spaced from the side wall of said shoulder; means engaging the strip beyond said saw to move the same into position upon said shoulder over said kerf, and means for fastening said strip in place upon said shoulder at intervals throughout the length of the strip.

3. In a machine for manufacturing screen-frame stock; a pair of spaced angularly arranged cutters adapted to separate a longitudinal strip from one corner of a piece of frame stock, means engaging the strip as it leaves the cutters to move the same laterally of the shoulder formed by the cutting of the strip, a cutter arranged to form a kerf in the bottom of the shoulder, and means engaging the strip beyond said last mentioned cutter to move the strip back into position upon the shoulder.

4. In a machine for manufacturing screen-frame stock; cutting means adapted to sever a longitudinal strip from one corner of a piece of frame stock, means arranged to separate said strip from the body of the stock, a cutting element arranged to travel in the opening thus formed to cut a kerf in the bottom of the shoulder provided by the severance of the strip from the body of the frame stock, said cutting means so positioned as to cut such kerf spaced from the side wall of the shoulder.

5. In a machine for manufacturing screen-frame stock; a saw arranged to cut a vertical kerf in a piece of frame stock spaced from one side thereof, a saw arranged to cut a horizontal kerf in the frame stock spaced from the top thereof to cooperate with the first mentioned kerf to sever a longitudinal strip from the frame stock along one corner thereof; a spreader arranged to enter said first mentioned kerf to move said strip laterally with respect to the frame stock widening said kerf, a saw arranged to travel in said widened kerf to cut a vertical kerf in the bottom of the shoulder spaced from the side thereof.

6. In a machine for manufacturing screen-frame stock; a saw arranged to cut a vertical kerf in a piece of frame stock spaced from one side thereof, a saw arranged to cut a horizontal kerf in the frame stock spaced from the top thereof to cooperate with the first mentioned kerf to sever a longitudinal strip from the frame stock along one corner thereof, a spreader arranged to enter said first mentioned kerf to move said strip laterally with respect to the frame stock widening said kerf, a saw arranged to travel in said widened kerf to cut a vertical kerf in the bottom of the shoulder spaced from the side thereof, and means engaging said strip to move the same laterally with respect to the frame stock back into position upon said shoulder covering the kerf cut in the bottom of the shoulder.

7. In a machine for manufacturing screen-frame stock; angularly arranged cutters adapted to sever a longitudinal strip, substantially rectangular in cross section, from one corner of a piece of frame stock; a spreader arranged to enter the kerf formed by one of the cutters to partially separate said strip and frame stock; a cutter arranged to enter the opening produced by such partial separation and adapted to form a kerf in the bottom of the shoulder of the frame stock, formed as a result of the severance of the strip therefrom; means adapted to move said strip and frame stock together, closing said partial separation; and means adapted to secure said strip and frame stock together at intervals throughout the length thereof.

8. In a machine for manufacturing screen-frame stock, angularly arranged saws adapted to sever a longitudinal strip from one corner of a piece of frame stock, a spreader adapted to enter the kerf formed by one of the saws to widen said kerf as the stock travels away from the saws, a saw arranged to enter the opening produced by the spreader to cut a kerf in the bottom of the shoulder of the frame stock formed by the severance of the strip therefrom, means adapted to move the strip and frame stock together closing the opening formed by the spreader and stapling mechanism coordinated with the travel of the stock adapted to fasten the strip upon the shoulder of the frame stock over the kerf formed therein.

9. In a machine for manufacturing screen-frame stock, angularly arranged saws adapted to sever a longitudinal strip from one corner of a piece of frame stock, a spreader adapted to enter the kerf formed by one of the saws to widen said kerf as the stock travels away from the saws, a saw arranged to enter the widened kerf to cut a kerf in the bottom of the shoulder of the frame stock formed by the severance of the strip therefrom, means adapted to move the strip and frame stock together closing the opening formed by the spreader, and stapling mechanism having a part frictionally engaging the frame stock to be actuated by the travel thereof to secure said strip to the frame stock at intervals throughout the length thereof.

10. In a machine for manufacturing screen-frame stock; angularly arranged cutters adapted to sever a longitudinal strip from one corner of a piece of frame stock as the stock is passed along longitudinally with respect to said cutters; means arranged to spread said strip and frame stock apart along the line of the incision formed by one of said cutters; and a cutter arranged to enter the opening formed by such spreading of said incision adapted to form a longitudinal groove in one face of the shoulder of said frame stock produced by said cutters.

11. That method of manufacturing screen-frame stock which consists in forming relatively, angularly arranged kerfs in a piece of frame stock to sever a longitudinal strip from one corner thereof, partially spreading said strip and frame stock, forming a kerf in the bottom of the shoulder caused by the severance of the strip from the frame stock, moving said strip and frame stock together closing said partial separation, and fastening said strip and frame stock together at intervals throughout the length thereof.

12. That method of manufacturing screen-frame stock which consists in performing the following operations successively upon a piece of frame stock in the order enumerated: forming relatively, angularly arranged incisions therein to sever a longitudinal strip from one corner thereof, partially spreading the strip thus formed from the remaining portion of the frame stock, passing a cutter through the separation opening thus provided to form a kerf in the bottom of the shoulder produced by the severance of the strip, moving said strip back upon said shoulder over the kerf thus formed and fastening said strip upon the shoulder at intervals throughout the length thereof.

13. Screen-frame stock comprising a pair of cooperating sections, one of said sections being provided with a shoulder extending along one corner adapted to receive the other section, said shoulder provided with a linear kerf formed in one face thereof spaced from the adjacent face, and means securing said sections together at intervals throughout the length thereof, one of said sections being disposed upon the shoulder of the other covering the kerf cut therein.

14. Screen-frame stock comprising a pair of cooperating sections, one section having a linear shoulder formed along one corner, the other section seated upon said shoulder, means removably securing said second section upon the shoulder at intervals throughout its length, and a kerf formed in the bottom of the shoulder underneath said second section.

In testimony whereof, I, ARTHUR T. BRENNAN, sign this specification.

ARTHUR T. BRENNAN.